United States Patent Office 3,505,348
Patented Apr. 7, 1970

3,505,348
PROCESS FOR THE PREPARATION OF
IMINO-THIAZOLIDINES
Alain Donche and Claude Thibault, Pau, France, assignors to Societe Nationale des Petroles d'Aquitaine, Courbevoie, France
No Drawing. Filed Dec. 19, 1967, Ser. No. 691,697
Claims priority, application France, Dec. 20, 1966, 88,100
Int. Cl. C07d 91/18
U.S. Cl. 260—306.7                                   3 Claims

ABSTRACT OF THE DISCLOSURE

This invention relates to a process for the preparation of imino-thiazolidines and, more particularly, to such a process for preparing imino-thiazolidines whose nitrogen atoms each carry a hydrocarbyl substituent, the process including the steps of heating a 1,3-thiazolidine-2-thione having a hydrocarbyl radical on its nitrogen atom with an isocyanic compound of the formula R'NCX, where X designates an oxygen or sulfur atom or a group N—R", where R' is a hydrocarbyl radical, and where R" is also a hydrocarbyl radical which may be different from R'.

BACKGROUND OF THE INVENTION

The invention has to do with the production of imino-thiazolidines, and more especially such compounds in which the nitrogen atoms carry hydrocarbon substituents; these are cyclic compounds which can be represented by the general formula:

$$\begin{array}{c} H_2C\text{------}N\text{---}R \\ |4 \quad\quad 3| \\ H_2C5 \quad 2C=N\text{---}R' \\ \diagdown 1 \diagup \\ S \end{array}$$

These compounds are of use as accelerator agents in the vulcanization of the copolymers isobutene-isoprene-dimethylfulvene. In performing this function it takes the place of mecaptobenzo-thiazole in the process described in the patent of Charles I Parris No. 2,628,955. These compounds can also be used as progressive sulfurizing agents for metals and other materials and as additives for rubbers. However, these compounds have been very difficult and expensive to manufacture. These and other difficulties experienced with the prior art devices have been obviated in a novel manner by the present invention.

It is, therefore, an outstanding object of the invention to provide a process for the manufacture of imino-thiazolidines which is practical and economical.

Another object of this invention is the provision of a process for making imino-thiazolidines substituted on the nitrogen with excellent yields from easily obtainable starting materials.

With the foregoing and other objects in view, which will appear as the description proceeds, the invention resides in the combination and arrangement of steps and the details of the composition hereinafter described and claimed, it being understood that changes in the precise embodiment of the invention herein disclosed may be made without departing from the spirit of the invention.

SUMMARY OF THE INVENTION

In general, the invention consists of a method of producing an imino-thiazolidine, the nitrogen atoms of which each bear a hydrocarbyl radical. The process consists in heating together at temperatures in the range from 150° to 250° C. a 1,3-thiazolidine-2-thione, the nitrogen atom of which has its hydrogen substituted by a hydrocarbyl radical with an isocyanic compound of the formula R'NCX, wherein X is selected from the group consisting of an oxygen atom, a sulfur atom, and nitrogen atom bearing a hydrocarbyl radical R", each of the hydrocarbyl radicals having 1 to 30 carbon atoms.

DESCRIPTION OF THE PREFERRED EMBODIMENT

The present process consists in heating a 1,3-thiazolidine-2-thione, substituted on the nitrogen, with an isocyanic compound of the formula:

$$R'\text{---}N\text{---}C\text{---}X \quad\quad\quad (1)$$

in which X is an oxygen or sulfur atom or an =N—R" group, while R' (and also R" which, if present, may be the same as or different from R') is a hydrocarbon radical such as an alkyl, aryl, aralkyl, alkaryl or cycloalkyl group.

The reaction upon which the process of the invention is based can be represented as follows:

$$\begin{array}{ccc} H_2C\text{------}CH_2 + R'NC\text{---}X & \longrightarrow & H_2C\text{------}CH_2 + CSX \\ | \quad\quad\quad | & & | \quad\quad\quad | \\ S \diagdown \quad\diagup N\text{---}R & & S \diagdown \quad\diagup N\text{---}R \\ C & & C \\ \| & & \| \\ S & & N\text{---}R' \\ (2) \quad\quad (1) & & (3) \end{array}$$

in which R has the meaning given above for R' and can be the same as or different from R' and/or R".

The compound R'NCX can be an isocyanate R'NCO, an isothiocyanate R'NCS or a carbo-diimide R'NC=NR". The radicals R' and R" can be alkyl radicals having from 1 to 30 carbon atoms, and particularly from 1 to 6 carbon atoms, such as methyl, ethyl, propyl, butyl, isobutyl, tert.-butyl, pentyls, hexyls, octyls, and so on. Alternatively, they may be aryl groups, in which case their aromatic nucleus (in particular, the benzene nucleus) can carry electropositive or electronegative substituents, for example, alkyls such as methyl, ethyl, hexyls or dodecyls, or halogens, in particular chlorine, or groups such as nitro or sulfo. Such groups include phenyl, methylphenyls, dimethyl-phenyls, ethylphenyl, butylphenyls, decylphenyls and naphthyls, for example. They can also be constituted by cycloalkyl groups, particularly cyclopentyls and cyclohexyls, which may be substituted. Thus, for example, methyl, ethyl, phenyl, cyclohexyl and other isothiocyanates are suitable for carrying out the invention.

The 3-R-1, 3-thiazolidine-2-thione, represented above by the Formula 2 can have any of the aforementioned radicals as R. In particular, it is possible to employ a 3-propyl-, 3-hexyl, 3-cyclopentyl-, 3-phenyl or 3-toluyl-1, 3-thiazolidine-2-thione.

Thiazolidine-thiones substituted on the nitrogen are compounds which can easily be prepared economically by the action of organic isothiocyanates on ethylene monothiocarbonate; they are then formed together with imino-dithiolanes, from which they can easily be separated. Thus, it is possible for the process according to the invention to be carried out with readily accessible industrial materials, such as isothiocyanates and monothiocarbonates, with separation, if necessary, of the iminodithiolane formed.

The reaction according to the invention can take place at temperatures of about 150° to 250° C. It can be accelerated by means of catalysts, in which case the preferred temperatures are of the order of 180° to 220° C.

Particularly suitable as catalysts are the salts of alkali metals (preferably basic salts) and also organic bases, particularly amines, urea and thiourea, which may be substituted. By way of non-limitative example, alkali metal carbonates can successfully be employed. The proportions of the reactants can be stoichiometric but, in the case of isocyanates and isothiocyanates, it is preferable to use an excess of these reactants relatively to the thiazolidine-thione, and in particular 2 mols of isocyanate or isothiocyanate to 1 mol of thiazolidine-thione.

The examples which follow illustrate the invention in a non-limitative manner:

EXAMPLE 1

A mixture of 19.5 g. (0.1 mol) of 3-phenyl-1,3-thiazolidine-2-thione

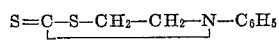
$$S=C-S-CH_2-CH_2-N-C_6H_5$$

with 23.8 g. (0.2 mol) of phenyl isocyanate $C_6H_5NCO$ and 0.05 g. (0.00047 mol) of $Na_2CO_3$, as catalyst, is heated to 200° C. for two hours.

The product obtained is taken up in 200 ml. of ether, then washed three times with 50 ml. of hydrochloric acid containing 18% by weight of HCl. The aqueous phase is then made alkaline, leading to the precipitation of 24.1 g. of 3-phenyl-2-phenyl-imino-1,3-thiazolidine:

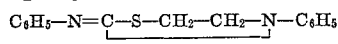
$$C_6H_5-N=C-S-CH_2-CH_2-N-C_6H_5$$

This corresponds to a yield of 95% with respect to the initial thiazolidine-thione. The product thus obtained has a melting point of 135° C.

EXAMPLE 2

The procedure is the same as in Example 1, but the phenyl isocyanate is replaced by 27 g. (0.2 mol) of phenyl isothiocyanate. 22 g. of 3-phenyl-2-phenylimino-1,3-thiazolidine of the same degree of purity are obtained; the yield is 87% with respect to the initial thiazolidine-thione.

EXAMPLE 3

Example 1 is repeated, but with 19.4 g. (0.1 mol) of diphenyl carbo-diimide $C_6H_5-N=C=N-C_6H_5$ instead of the phenyl isocyanate.

3-phenyl-2-phenyl-imino, 1,3-thioazolidine is then obtained almost quantitatively, namely: 25.2 g., that is to say, a yield of 99%. At the same time, there is recovered quantitatively, phenyl isocyanate $C_6H_5-N=C=S$ formed by the action of the carbodiimide on the thiazolidine-thione in accordance with the Equations 2, 1, 3 indicated above.

EXAMPLE 4

The 3-phenyl-2-phenylimino-1, 3-thiazolidine prepared according to Example 1 has been used in place of mercaptobenzothiazole as accelerator agent in the vulcanization of the copolymers isobutene-isoprene-dimethyl-fulvene described in U.S. Patent No. 2,628,955 to Charles I. Parrish.

The test has been carried out with a copolymer formed by 96, 75% of isobutene, 2.5% of isoprene and 0, 75 of 6, 6'-dimethyl-fulvene, the percent being by volume, according to Example 5 (columns 8 and 9, and Table II of the above U.S. patent).

The test procedure having been the same, which is described in U.S. Patent No. 2,628,955, the mixtures used were the following ones:

|  | Parts by weight | |
|---|---|---|
|  | USP 2,628,955 | Present Example 4 |
| Copolymer | 100 | 100 |
| Zinc oxide | 5 | 5 |
| Stearic acid | 3 | 3 |
| Mercaptobenzothiazole | 0.5 | |
| 3-phenyl-2-iminophenyl-1, 3-thiazolidine | | 0.5 |
| Tetramethyl thiuram disulfide | 1 | 1 |
| Sulfur | 2 | 2 |
| Channel Black (E.P.C.) | 50 | 50 |
| The thus vulcanized copolymer showed: | | |
| 300% modulus in kg./cm.²— | | |
| After 40 minutes curing at 153° C | 42.4 | 42 |
| After 60 minutes curing at 153° C | 54.5 | 56.2 |
| After 120 minutes curing at 153° C | 65.2 | 69.8 |
| Tensile strength in kg./cm.²— | | |
| After 40 minutes curing at 153° C | 234 | 230 |
| After 60 minutes curing at 153° C | 227 | 238 |
| After 120 minutes curing at 153° C | 234 | 246 |

While it will be apparent that the illustrated embodiments of the invention herein disclosed are well calculated adequately to fulfill the objects and advantages primarily stated, it is to be understood that the invention is susceptible to variation, modification, and change.

The invention having been thus described, what is claimed as new and desired to be secured by Letters Patent is:

1. A process for preparing 3-phenyl-2-phenylimino-1, 3-thiazolidine, which consists in heating at 180° to 220° C. a mixture of one mole of 3-phenyl-1,3-thiazolidine-2-thione with 1 to 2 moles of phenyl-isocyanate and 0.0001 to 0.01 mole of sodium carbonate until a substantial amount of 3-phenyl-2-phenylimino-1, 3-thiazolidine is formed, and in then separating the thiazolidine from the mixture.

2. A process for preparing 3-phenyl-2-phenylimino-1, 3-thiazolidine, which consists in heating at 180° to 220° C. a mixture of one mole of 3-phenyl-1, 3-thiazolidine-2-thione with 1 to 2 moles of phenyl-isothiocyanate and 0.0001 to 0.01 mole of sodium carbonate until a substantial amount of 3-phenyl-2-phenyl-imino-1, 3-thiazolidine is formed, and in then separating the thiazolidine from the mixture.

3. A process for preparing 3-phenyl-2-phenylimino-1, 3-thiazolidine, which consists in heating at 180° to 220° C. a mixture of one mole of 3-phenyl-1, 3-thiazolidine-2-thione with 1 to 2 moles of diphenyl-carbodiimide and 0.0001 to 0.01 mole of sodium carbonate, until a substantial amount of 3-phenyl-2-phenylimino-1, 3-thiazolidine is formed, and in then separating the thiazolidine from the mixture.

References Cited

UNITED STATES PATENTS 2,784,196   3/1957   Bacchetti _____ 260—306.7

ALEX MAZEL, Primary Examiner

R. J. GALLAGHER, Assistant Examiner